United States Patent [19]

Plaot

[11] 4,185,902
[45] Jan. 29, 1980

[54] LIGHT ABSORPTION DEVICE FOR THE PREVENTION OF STRAY LIGHT IN PARTICULAR IN A PHOTOTYPESETTER

[75] Inventor: Michael Plaot, Hamburg St., #36, Eschborn, Fed. Rep. of Germany

[73] Assignee: Michael Plaot, Eschborn, Fed. Rep. of Germany

[21] Appl. No.: 912,261

[22] Filed: Jun. 2, 1978

[30] Foreign Application Priority Data

Jun. 3, 1977 [DE] Fed. Rep. of Germany ....... 2725107

[51] Int. Cl.² .............................................. B41B 21/24
[52] U.S. Cl. .................... 354/5; 350/276 SL
[58] Field of Search ............ 354/4, 5, 10, 12, 13; 350/276 R, 276 SL, 278

[56] References Cited

U.S. PATENT DOCUMENTS 3,984,157  10/1976  LeVantine .................... 350/276 SL

FOREIGN PATENT DOCUMENTS 361901  2/1973  U.S.S.R. .................................. 354/13

Primary Examiner—Russell E. Adams
Attorney, Agent, or Firm—Joel I. Rosenblatt

[57] ABSTRACT

A phototypesetter has an optical path including a beam splitter intersecting the main light path and an auxiliary light path for reflecting the auxiliary light path into the main light path. An absorption element with a concave front surface is mounted behind the beam splitter to absorb the non-reflected light from the auxiliary beam. Additionally, the concave surface directs the nonabsorbed light to a light absorbent body.

1 Claim, 1 Drawing Figure

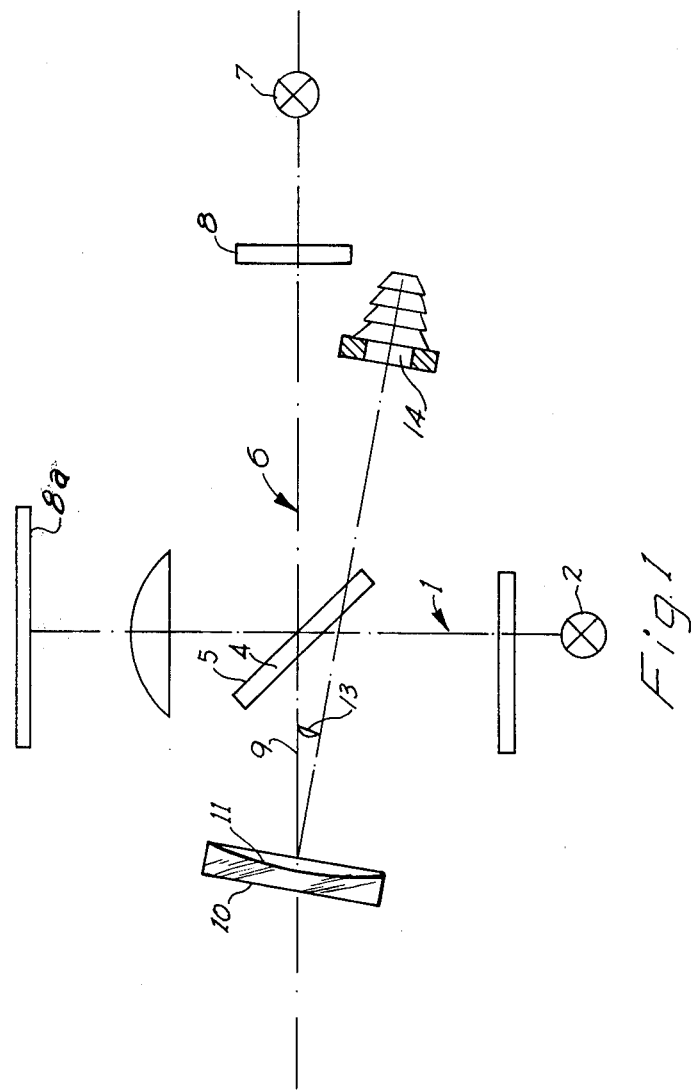

LIGHT ABSORPTION DEVICE FOR THE PREVENTION OF STRAY LIGHT IN PARTICULAR IN A PHOTOTYPESETTER

The invention concerns an absorption device for elimination of stray light, specifically in a phototypesetting machine according to the preamble of claim 1.

In phototypesetting machines where a secondary ray is reflected into a primary ray with a partially translucent and partially reflecting surface which is arranged both in the primary and the secondary ray it is desired to eliminate the secondary ray light which by the reflecting surface is permitted to pass while not being utilized for reflection. This is supposed to take place in a fashion such that no interfering stray light will proceed onto the light-sensitive material which is arranged in the primary ray and in the secondary ray united with it. In the primary ray of a phototypesetting machine there are arranged, specifically, an illuminating device, a font strip and a lens for reproduction of a selected portion of the font strip on light-sensitive material. For beaming in the secondary ray there is a partially translucent and partially reflecting surface provided between the font strip and the lens in the primary ray, which surface may be formed by two prisms which are glued to one another at their bases, thereby representing a divider cube. Arranged in the secondary ray is a second illuminating device, a second font strip, for instance for special signs or, instead of the second font strip, a device for generation of a light spot for producing a line.

The problem of eliminating the light passing through the partially translucent and partially reflecting surface, of the secondary ray, is particularly grave when only a fraction of the light impinging on the partially translucent and partially reflecting surface is supposed to be reflected into the primary ray, whereas the major part of the light in the secondary ray passes through the surface. Such dimensioning of the partially translucent and partially reflecting surface is desired in order to reflect from the main ray as little light as possible which originates from the first font strip.

Pertaining to the state of the art are devices for eliminating stray light where the undesired light is absorbed by mat black surfaces. Instead of these surfaces it is possible as well to provide holes with a conic limitation and a limiting structure which reflects the undesired light to the interior of the cone. Such devices enable an approximately 95% absorption, since an ideally black surface does not exist. In applications where only a small portion of the light of a ray is utilized on a surface, for instance by reflection, however, this absorption is still too low, since the remaining unutilized portion of the light ray can still cause, e.g., an undesirable blackening of the light-sensitive material of a phototypesetting machine. The problem underlying the present invention is therefore to provide an absorption device which, while avoiding the disadvantages of prior absorption devices, enables a better absorption of the light ray, thereby extensively avoiding interfering stray light. In view of the absoprtion properties, the expense for this device should be low.

The problem is solved with an absorption device of the initially named type with the characterizing feature of the claim 1.

This absorption device operates on the principle that an absorption body is arranged in the path of the light which is to be eliminated, which body collects the radiation impinging on it, and which is not absorbed, in a focal point which is directed at a point which will not cause a disturbance. The light rays not absorbed by the absorptive body must therefore not generate a disturbing stray light, since it is possible to combine these rays and render them harmless by further absorption at a suitable point.

The concave surface of the absorption body is favorably provided with a vaporized reflex-reducing coating. This will further reduce the stray light portion that could be created by undirected reflection of the bundle falling on the absorption body.

Particularly favorable absorption properties has a device with the characteristic that the absorption body consists of a material which is absorptive throughout.

As a variant, the absorption body may consist of colored glass. Another variant provides for an absorption body from plastic dyed throughout. The latter variant excels through a particularly low manufacturing expense.

The absorption device is suitably further advanced in a fashion such that the absorption body is turned by an angle relative to the main beam of the secondary ray. As a result, the focal point of the absorption body does not lie in the path of the secondary ray. The rays received by the concave surface of the absorption body and reflected back in a focal point are thus not reflected back and forth by necessity, in the path of the secondary ray, if an optical element which of necessity is arranged in the path of the secondary ray is relatively well reflective. The light reflected by the absorption body in a focal point can rather be absorbed at comparatively low expense outside the path of the secondary ray.

A suitable dimensioning of the device provides for an angle in the range between 3° and 25° by which the absorption body is turned relative to the main beam of the secondary ray. While thereby the concave absorbing surface of the absorption body, on the one hand, is extensively used for absorption, the focal point of the absorption body, on the other hand, lies already so far outside the main beam of the secondary ray that at the spot of the focal point another absorbing medium can be arranged.

In a preferable embodiment, the device has the characteristic that in the focal point of the absorption body with a concave surface there is a black body arranged. The latter may be fashioned as a mat black surface or also as a hole with a conic absorbing limitation.

An absorption device with the above characteristics enables an absorption which is high in relation to the expense. For instance, the absorption body with concave surface and reflex reducing treatment reflects only about 0.2% of the light incidence in its focal point. When providing in the focal point a customary black body, which in turn will absorb 95% of the incident light, the stray light intensity as a whole is reduced to 0.01%.

An embodiment of the invention will be more fully explained hereafter with the aid of the drawing. The absorption device in a secondary ray falling on a primary ray is illustrated in the drawing in plan view.

Marked 1 in the drawing is the main beam of the primary ray. Arranged in the primary ray are a lamp 2 of a first illuminating device, a font strip 3, and a reflex plate 4 with a reflecting surface 5.

Arranged in the secondary ray, whose main beam is marked 6, are a second illuminating device with a lamp 7, an aperture 8 for generating a line element. The secondary ray is deflected into the primary ray by the reflecting surface 5 so that the secondary ray, combined with the primary ray, will fall on the light-sensitive material 8a.

For absorption of the light passing through the reflex plate there is an absorption body 10 arranged in the extension of the secondary ray, in section 9 of it.

The absorption body consists of glass dyed dark and features a concave smooth surface 11 facing toward the reflex plate 4. An antireflex coating is vaporized on the concave surface.

The optical axis 12 of the absorption body in which lies the focal point of the concave surface is turned by a small angle 13 relative to section 9 of the ray. Provided in the focal point is an opening with a following, nonabsorbent cone 14.

In this setup of the absorption device the light passing through the reflex plate 4 in the secondary ray is absorbed for the most by means of the absorption body 10. The small portion of the total intensity which despite the coloring of the absorption body and the antireflex coating is reflected by it will not be deflected into the optical device, but combined in the opening with the light-absorbing cone 14 by which also most of the residual portion of the light to be eliminated is absorbed. On the whole, the undesired light in the optical device is almost completely eliminated by the double absorption at defined spots.

I claim:

1. An absorption device for use in a light ray projection system of a phototypesetter, having a primary ray and a secondary ray projection and wherein the secondary ray is directed into the primary ray with a partially translucent and partially reflecting surface, said surface being arranged within the path of said primary ray and said secondary ray projection, and including an absorption body disposed in an extension of the secondary ray projection from the backside of said partially reflecting and partially translucent surface, said absorption body arranged to absorb radiation of said secondary ray, said absorption body having a concave surface arranged to direct said secondary ray at an angle relative to the direction of the secondary ray projection and at a focal point, and black body means for absorbing light placed at the focal point for absorbing light from said concave surface.

* * * * *